May 1, 1951 J. R. TUSSON 2,550,948
CATALYTIC CONTACTING APPARATUS
Filed March 24, 1948
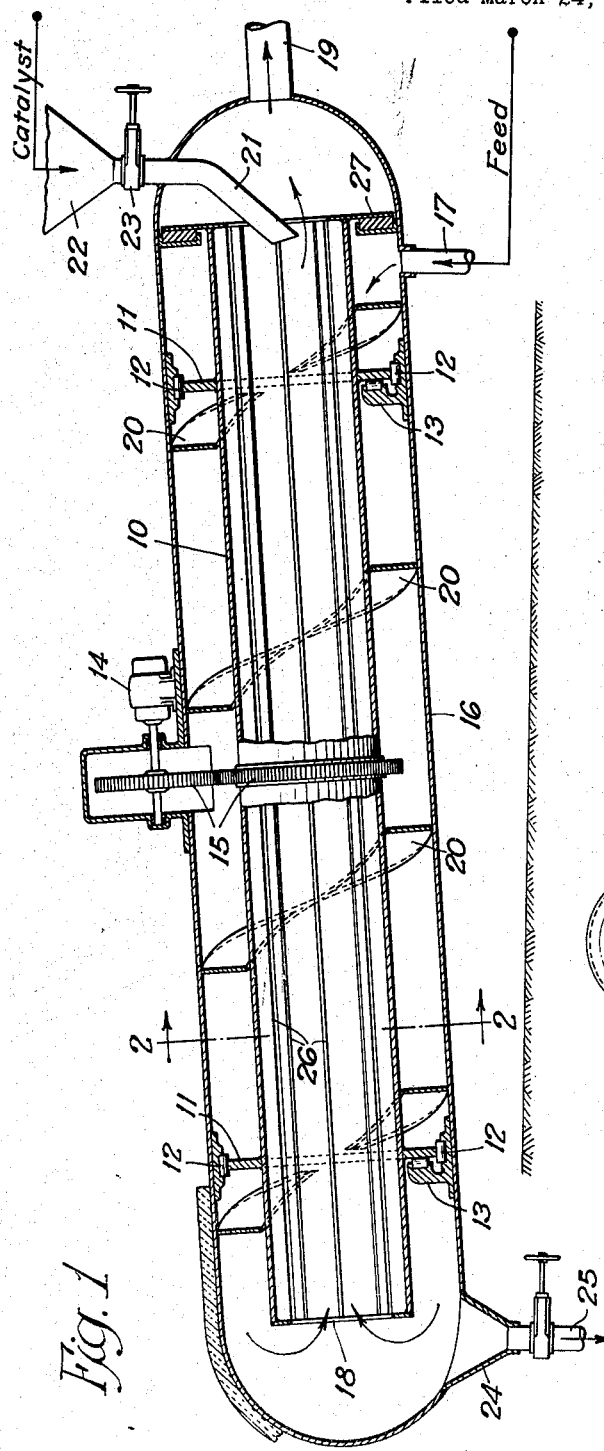
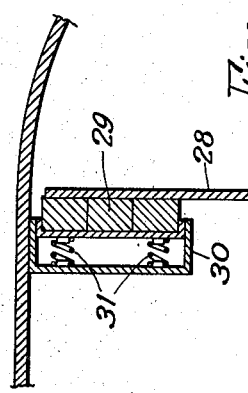
INVENTOR.
John R. Tusson
BY
Vanderver Voorhees
ATTORNEY Patented May 1, 1951

2,550,948

UNITED STATES PATENT OFFICE 2,550,948

CATALYTIC CONTACTING APPARATUS

John R. Tusson, Hammond, Ind., assignor to Standard Oil Company, Chicago, Ill., a corporation of Indiana Application March 24, 1948, Serial No. 16,720

1 Claim. (Cl. 23—289)

This invention relates to a method and apparatus for conducting reactions under pressure and more particularly to reactions conducted in the presence of solids, such as heterogeneous catalysts. One object of the invention is to effect contact between gases and solids under pressure in a continuous manner. Another object of the invention is to effect uniform treatment of solids with gases at elevated pressure and temperature. Still another object of the invention is to provide an apparatus for uniformly contacting solids with gases continuously and countercurrently or cocurrently under pressure. A more specific object of the invention is to provide a rotating kiln-type contacting apparatus which can be operated under pressure for contacting solids with gases and which is free from troublesome and expensive packing glands.

The invention is illustrated by a drawing in which:

Figure 1 shows diagrammatically the general arrangement of the apparatus;

Figure 2 is a cross-section taken thru the apparatus of Figure 1; and

Figure 3 is a detail of the block seal employed within the apparatus shown in Figure 1.

In the treatment of solids with gases, for example as in roasting ores in air, the absorption of gases in solid absorbents such as charcoal, lime, fuller's earth, etc., and the reaction of solid catalysts with gases and vapors, as in the treatment of petroleum vapors with activated clays, aluminum oxide, silica gel, iron oxide, etc., to effect desulfurization, conversion, reforming, etc., it is often desirable to obtain uniform contact between the finely divided solid and the gas. A convenient and effective apparatus for contacting fine solids with gases is the rotary kiln commonly used in the cement and metallurgical industries. However, this apparatus has not been adapted to use under pressure because of the practical impossibility of maintaining seals at the inlet and outlet, particularly where it is desired to operate at elevated temperatures upwards of 400° C. and also where it is desired to continuously introduce and remove the solids. I have now devised an apparatus which accomplishes these objects and which is illustrated in Figure 1 of the drawing.

Referring to the drawing, the rotatable cylinder or kiln 10 is supported on trunnions 11 which are carried on rollers 12 and 13 in the usual manner. The number of trunnions provided is sufficient to support the cylinder 10 thruout its length without excessive bending stresses. Thus cylinder 10 may be twenty feet to one hundred feet long or longer, if desired, depending on the demands of the operation for which it is used. Power to rotate the kiln is supplied by motor or drive 14 thru a suitable gear indicated at 15. It is usually desirable that the moving parts be designed or operated without lubrication other than that provided by graphite, mica and such thermally resistant materials. To avoid packing the drive shaft, the motor 14 may be enclosed in a pressure chamber in communication with the reactor.

Surrounding kiln 10 is pressure vessel or jacket 16 designed to withstand the pressure of the particular operation under consideration. For example it may be desired to conduct operations at pressures of 25 to 250 p. s. i. or even as high as 1000 p. s. i. in some cases. Inasmuch as jacket 16 is stationary and readily supportable, it may be constructed as heavy as necessary to withstand any pressure desired without encountering mechanical difficulties.

Fr the usual operation, it is heat insulated externally as indicated, but for operations at elevated temperature, it is preferred to place the insulation on the inside walls to protect the metal, especially when high pressure is used.

Gases fed to the apparatus are supplied by line 17 and flow around the kiln 10 to the open end 18, thence thru the kiln and out at exit 19. Baffles 20 fixed to the inside of the pressure chamber serve to guide the feed gases thru a spiral path, thereby effecting better contact and heat exchange between the feed gases and the external wall of kiln 10. Obviously there are numerous arrangements of baffles which may be used for this purpose and, if desired, the baffles may be partly or entirely fixed to the rotating kiln 10, serving the added purpose of increasing heat exchange. In the case of reactions conducted at elevated temperature, especially endothermic reactions, it is usually desirable to supply the gases in heated condition, in which case they serve to heat the kiln and indirectly supply heat to the reaction, producing a relatively uniform temperature thruout the reaction chamber. In case of exothermic reactions, the feed gases may be supplied cold, serving to cool the walls of vessel 16.

Where the reaction is conducted in a continuous countercurrent fashion and the catalyst or other solid is continuously introduced and withdrawn, it is desirable to incline the apparatus as shown in Figure 1 to obtain gravity flow of solids therethru. In this case the solids, for example, powdered or granular alumina catalyst such as bauxite, are continuously introduced by feed pipe 21 supplied from chamber 22, shown partly cut away, thru valve 23. With powdered solids a gate valve will usually be employed and the solids can be held in fluidized form within chamber 22 by the introduction of aeration gas by means not shown. Where granular solids are employed it may be desired to use a star valve to obtain uniform introduction of solids to the apparatus. During the rotation of kiln 10, the solids are gradually carried by gravity thru the reaction chamber, where they are intimately contacted with the gas stream, the solids finally leaving the chamber at the open end 18 falling into the outlet 24. Valved duct 25 conducts the solids to a suitable receiver, usually a drum in which the pressure is balanced against that within chamber 16, so that free flow of solids thru the receiving line is permitted. Other suitable means may be provided for disposing of spent catalyst or other solid material discharged from the apparatus.

Kiln 10 is preferably equipped with baffles or flights 26 on the interior as shown in Figure 2. These serve to pick up the finely divided solids and drop them thru the open space within the reaction chamber, thereby more intimately exposing the solids to the action of the gases. These baffles may also serve as heat-conducting fins to supply heat to the reacting gases or cool them in the case of endothermic or exothermic reactions, respectively. Finely divided solids carried from the reaction chamber by the gas stream as a dust may be collected by cyclone separators, electrostatic precipitators, bag filters, or other well-known recovery devices, and returned to the reaction chamber if desired.

In order to prevent feed gases bypassing the reaction chamber, a seal ring 27 is provided between inlet 17 and outlet 19. This seal may be constructed as shown in Figure 3 which shows circular disc or flange 28 bearing against block 29 supported in retaining ring 30. Springs 31 adjust the position of block 29 holding it in gentle contact with flange 28. Block 29 is suitably graphite or other self-lubricating substance resistant to elevated temperature. It is not necessary to provide a tight seal at 27 because of the very slight pressure difference between the inlet and the outlet, substantially no resistance to flow of gases being provided by the curtain of solids in reaction chamber 10. Thus a seal of the brush type can be used where its main purpose is to prevent convection of gases.

As indicated hereinabove, there are numerous applications of my pressure-contacting apparatus. Thus in the catalytic conversion of hydrocarbons with activated clays, Superfiltrol, silica-alumina catalysts, etc., deposits of carbon formed on the catalyst can be removed in my apparatus by contacting with air, generally at a temperature of about 950 to 1100° F. This reaction is exothermic and the heat generated in kiln 10 may be dissipated by contacting with cold air introduced at 17 and/or other points of inlet along the reaction chamber. The regeneration reaction can be conducted at a pressure of about 20 to 100 p. s. i., and regenerated catalyst withdrawn at 25 may be conducted while hot back to the reaction chamber for contacting additional amounts of hydrocarbon vapors, for example gas oil vapors to be converted into gasoline. The conversion reaction may be carried out in fluidized mass of catalyst thru which the hydrocarbon vapors are conducted in an upward direction, and in this case it is preferred to maintain substantially the same pressure within the regenerating apparatus and the conversion stage of the process. For high temperature operations of this type, it is desirable to construct the kiln 10 of thermally resistant alloys such as Calite or high chrome steel.

My pressure kiln is particularly well suited for use in the production of synthetic hydrocarbons by catalytic reduction of carbon monoxide with hydrogen in the well-known Fischer process. The catalyst preferred in this process is iron, generally promoted with potassium oxide. The iron catalyst used in this process may also be prepared in the kiln reactor. Thus iron oxide, e. g. $Fe_3O_4$, containing about one-half to one per cent $K_2O$ may be charged to the rotating reactor by line 21. Hot hydrogen at a pressure of 10 to 100 p. s. i., for example, is introduced by line 17 and reduces the iron oxide largely to metallic iron, the oxygen being eliminated by line 19 as $H_2O$ with an excess of hydrogen. After condensing the $H_2O$ the excess hydrogen can be recycled. By operating under elevated pressure the rate of reduction of the iron oxide is substantially increased. The temperature required for this operation is usually of the order of 650 to 850° F. The reduced catalyst withdrawn at 25 is maintained out of contact with air while being charged to the hydrocarbon synthesis reactor where it is contacted with a mixture of carbon monoxide and hydrogen.

In the Fischer reaction conducted with iron catalyst at a temperature of about 550 to 700° F., the life of the catalyst is usually from several days to several weeks or longer, and accordingly it is not necessary to feed catalyst continuously. In this case the rotating kiln reaction chamber may be placed in a horizontal position instead of inclined as shown. Dams in the form of donut rings may be provided at the two ends of chamber 19, for example, to prevent loss of catalyst. When it is desired to add make-up catalyst periodically to maintain catalyst activity and replace catalyst lost as dust in the product gases, the desired amount of fresh catalyst is added thru induction line 21 as previously described. The synthesis reaction is conveniently carried out at a pressure of about 100 to 400 p. s. i. and, being highly exothermic, the heat involved may be dissipated thru the walls of the rotating vessel 19 into the feed gases supplied thru line 17 and/or additional inlets, not shown, properly spaced along the reaction chamber 16. By charging cold or partially preheated feed gases, the desired temperature control is obtainable.

Having thus described my invention what I claim is:

Apparatus for contacting fluids with solids at elevated temperatures and pressures which apparatus comprises a long inclined cylindrical pressure vessel, a long concentric cylindrical kiln rotatably supported within said pressure vessel, an outwardly extending annular flange carried by one end of said kiln, an inwardly extending retaining ring carried by the pressure vessel adjacent said flange, a seal between said flange and said ring, a driving mechanism in said pressure vessel for rotating said kiln, a conduit extending through the upper pressure vessel wall at the high end of the inclined pressure vessel for directing solids into the rotating kiln, an outlet at the bottom of the lower end of the pressure vessel for discharging solids, a fluid transfer port at the end of the pressure vessel nearest the seal, a second fluid transfer port in said pressure vessel also adjacent but on the opposite side of said seal, baffles between the pressure vessel and the rotating kiln for causing spiral flow of fluids around said kiln and baffles on the inner walls of said rotating kiln for effecting intimate contact between solids and fluids in the rotating kiln.

JOHN R. TUSSON.

REFERENCES CITED

The following references are of record in the file of this patent:

UNITED STATES PATENTS

| Number | Name | Date |
|---|---|---|
| 501,539 | Scharf | July 18, 1893 |
| 1,332,137 | Newhouse | Feb. 24, 1920 |

FOREIGN PATENTS

| Number | Country | Date |
|---|---|---|
| 259,657 | Great Britain | Oct. 13, 1926 |